(12) United States Patent
Papafotiou et al.

(10) Patent No.: US 8,498,133 B2
(45) Date of Patent: Jul. 30, 2013

(54) CONTROLLING A HIGH-VOLTAGE DIRECT-CURRENT (HVDC) LINK

(75) Inventors: Georgios Papafotiou, Adliswil (CH); Giovanni Beccuti, Zürich (CH); Lennart Harnefors, Ludvika (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 13/192,126

(22) Filed: Jul. 27, 2011

(65) Prior Publication Data

US 2012/0033461 A1 Feb. 9, 2012

Related U.S. Application Data

(63) Continuation of application No. PCT/EP2009/067656, filed on Dec. 21, 2009.

(60) Provisional application No. 61/147,610, filed on Jan. 27, 2009.

(51) Int. Cl.
*H02J 3/36* (2006.01)

(52) U.S. Cl.
USPC ............................... 363/35; 700/29; 700/297

(58) Field of Classification Search
USPC .... 363/35, 51; 700/29, 32, 297–298; 307/105
See application file for complete search history.

(56) References Cited

U.S. PATENT DOCUMENTS 7,587,253 B2 * 9/2009 Rawlings et al. ............... 700/53

OTHER PUBLICATIONS

Xiaoyan Wen, Dynamic Model and Predictive Current Control for Voltage Source Converter Based HVDC, Oct. 26, 2006, 2006 International Conference on Power System Technology, pp. 1-5.*
R.R. Negenborn, Supervisory hybrid model predictive control for voltage stability of power networks, Jul. 13, 2007, Proceedings of the 2007 American Control Conference, pp. 5444-5449.*
Adel Farag, Robust Control of a VSC HVDC Terminal Attached to a Weak System, Jun. 25, 2003, Proceedings of 2003 IEEE Conference on Control Applications, pp. 173-175.*

* cited by examiner

*Primary Examiner* — Harry Behm
(74) *Attorney, Agent, or Firm* — Buchanan Ingersoll & Rooney PC

(57) ABSTRACT

The present disclosure is directed to a High Voltage Direct Current (HVDC) link with Voltage Source Converters VSC and interconnecting two power systems. A model-predictive control with a receding horizon policy is employed for controlling the outer loop of a two-loop or two-layer control scheme or setup for the HVDC link. The two-loop control scheme takes advantage of the difference in speed of the dynamics of the various system variables of the HVDC link and the interconnected power systems. Model-based prediction representative of the interconnected power systems' behavior enables comparison of the future effect of different control inputs applied within the control scheme, while taking into account any physical, safety and operating constraints. It is valid for a complete operating range, e.g., it avoids performance degradation when moving away from the nominal operating point of the control scheme for a HVDC link.

14 Claims, 3 Drawing Sheets

CONTROLLING A HIGH-VOLTAGE DIRECT-CURRENT (HVDC) LINK

RELATED APPLICATION

This application is a continuation application under 35 U.S.C. §120 of PCT/EP2009/067656 filed as an International Application on Dec. 21, 2009 designating the U.S., which claims the benefit under 35 U.S.C. §119 of U.S. Provisional Patent No. 61/147,610 filed on Jan. 27, 2009, the entire contents of which are hereby incorporated by reference in their entireties.

FIELD

The present disclosure relates to the field of electric power transmission networks. More particularly, the present disclosure relates to a method for the control and/or operation of electric power systems interconnected by a High-Voltage Direct-Current (HVDC) link with Voltage-Source Converters (VSC).

BACKGROUND INFORMATION

Voltage-Source Converters (VSC) for High-Voltage Direct-Current (HVDC) systems offer a cost-effective solution for interconnections in or between power networks, allowing for active and reactive power control in both directions, while preventing fault propagation and generally increasing low-frequency and voltage stability. The main control challenge for the operation of VSC-HVDC systems is achieving a stable and reliable operation over a wide range of operating conditions and system parameters. Moreover, suppression of transient over-voltages and over-currents is crucial for the operation of the system. Known control solutions for VSC in HVDC applications are based on the design of controllers using locally linearized and/or averaged system models which are barely capable of predicting or analyzing the emergence of local power system instabilities, since the dynamics which cause the latter are not properly accounted for in the controller design.

The paper "Dynamic Model and Predictive Current Control of Voltage Source Converter Based HVDC" by Xiaoyan Wen et al., IEEE International Conference on Power System Technology 2006 (XP031053573), proposes a control method for a VSC-HVDC with a slow "external" and a fast "internal" control loop. The external or outer control loop controls the DC link voltage and/or the active and reactive power flows by determining the two converter current component references ($i_\alpha$, $i_\beta$) in a rotating reference frame as input to the internal or inner control loop. The latter calculates the voltages used to track the requested currents, for example, modulation voltages $u_\alpha$, $u_\beta$ are determined and ultimately fed into a Pulse Width Modulator (PWM) unit. The internal loop is designated as a "predictive current control" and assumes that the desired current reference will be attained with a simple one-step-ahead prediction. The external loop features a phase-locked loop (PLL) to transform (into the rotating reference frame) and decouple the state variables so that the adopted PI (Proportional-Integral) control scheme can operate correctly.

SUMMARY

An exemplary embodiment provides a method of controlling a High-Voltage Direct-Current (HVDC) link with two Voltage-Source Converters (VSC) and interconnecting two power systems. The exemplary method includes: (a) determining, at the beginning of an extended sampling period, a present state of the HVDC link and the power systems; (b) deriving a sequence of desired converter current reference values by optimizing, over a prediction horizon, an objective function based on a prediction model representing the HVDC link and the power systems; (c) passing a first one of the desired value, of said sequence to an inner control loop; (d) deriving, by the inner control loop and based on said received first one of the desired values, optimized pulse-width modulation voltage reference values; (e) applying the optimized pulse-width modulation voltage reference values to a Pulse-Width Modulator unit of a VSC; (f) repeating steps (d) and (e) during the extended sampling period; and (g) closing an outer control loop by returning to step (a) at the end of the extended sampling period.

An exemplary embodiment provides a non-transitory computer-readable medium having a computer program recorded thereon that causes a processor of a computer processing device to control a High-Voltage Direct-Current (HVDC) link with two Voltage-Source Converters (VSC) and interconnecting two power systems. The program causes the processor to execute operations including: (a) determining, at the beginning of an extended sampling period, a present state of the HVDC link and the power systems; (b) deriving a sequence of desired converter current reference values by optimizing, over a prediction horizon, an objective function based on a prediction model representing the HVDC link and the power systems; (c) passing a first one of the desired value, of said sequence to an inner control loop; (d) deriving, by the inner control loop and based on said received first one of the desired values, optimized pulse-width modulation voltage reference values; (e) applying the optimized pulse-width modulation voltage reference values to a Pulse-Width Modulator unit of a VSC; (f) repeating operations (d) and (e) during the extended sampling period; and (g) closing an outer control loop by returning to operation (a) at the end of the extended sampling period.

BRIEF DESCRIPTION OF THE DRAWINGS

Additional features, aspects and advantages of the present disclosure will be explained in more detail in the following text with reference to exemplary embodiments which are illustrated in the attached drawings, in which.

DETAILED DESCRIPTION

Figure 1:
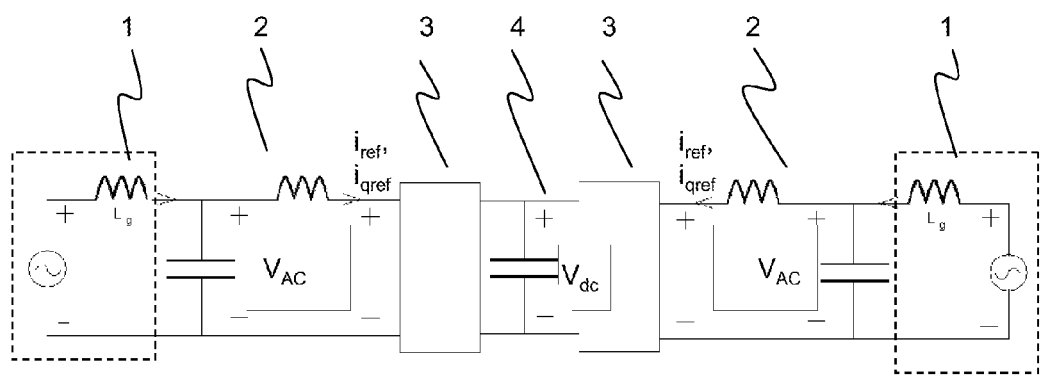
FIG. 1 schematically shows an HVDC link interconnecting two power systems according to an exemplary embodiment of the present disclosure.

Exemplary embodiments of the present disclosure provide a stable and reliable operation of power systems interconnected by a High-Voltage Direct-Current (HVDC) link with Voltage-Source Converters (VSC). Exemplary embodiments of the present disclosure provide a control method and a non-transitory computer-readable medium having a computer program recorded thereon according for controlling a HVDC link with two VSCs and interconnecting two power systems.

In accordance with an exemplary embodiment of the disclosure, the initial state of the HVDC link and the interconnected power systems is determined at the beginning of an extended sampling period. A discrete-time prediction model including the HVDC link and the interconnected power systems is used to predict the effect of a particular sequence of converter current values as exemplary control inputs or decision variables over a desired prediction horizon includes a plurality of time steps into the future. A desired (e.g., optimum) sequence of converter current values is identified as desirably (e.g., optimally) approximating the target or desired behavior of selected controlled variables by optimizing an objective function. Out of this desired sequence, only the first converter current values are retained and provided to an inner loop of the control scheme for the HVDC link, all subsequent control inputs of the sequence being discarded. The inner loop, for the rest of the extended sampling period and based on the first optimized converter current values, repeatedly determines desirable (e.g., optimized) pulse-width modulation voltage reference values. These voltage references are then forwarded and applied to the Pulse-Width Modulator (PWM) units in the VSCs of the HVDC link. At the beginning of the following extended sampling period, the updated state of the HVDC link and the interconnected power systems is acquired, and the following first converter current values are determined and provided to the inner loop.

The sequence of desired (e.g., optimal) future control inputs is obtained by evaluating, (e.g., minimizing) an objective, target or cost function. The objective function penalizes the deviation of the controlled variables from their references or control objectives. The controlled variables include at least one of (i) an active or reactive power $P_{in}$) $Q_{in}$ transmitted across the HVDC link, (ii) a DC-link voltage $V_{dc}$ of the HVDC link, and (iii) an AC filter voltage amplitude $V_{ac}$ at the VSC of the HVDC link. The objective function in turn depends on future states or an anticipated behavior as predicted by the prediction model of the HVDC link and the interconnected power system in conjunction with the future control inputs, and at the same time satisfies predetermined constraints. The latter include physical (e.g., voltage reference limits of the VSC), safety (e.g., current limitation in case of a fault) and operational constraints of the power system.

In accordance with an exemplary embodiment, the prediction model of the power system is Piecewise Affine (PWA). This provides for more modeling capabilities, and the prediction model can describe different modes of operation and incorporate discrete-valued states and inputs that are used for modeling logic components.

In accordance with an exemplary embodiment of the present disclosure, the inner loop optimization problem is linear and pre-solved off-line for the whole operating range, leading to a look-up table of optimized pulse-width modulation voltage reference values or PWM control laws. The latter can later be evaluated continually given the converter current reference value at the beginning of an extended sampling period as well as updated system quantity values repeatedly sampled, at a system control frequency, during the extended sampling period. A pre-solution is particularly useful, for example, in case of limited computational capacity of a Digital Signal Processor (DSP) or a Field-Programmable Gate Array (FPGA) executing the inner loop.

Exemplary embodiment of the present disclosure can be applied to power systems including a weak network with a grid impedance $L_g$ exceeding 0.5, for example. In this case, the AC filter voltage amplitude $V_{ac}$ at the VSC of the HVDC link, for example, can be a controlled variable yielding the best optimization results.

In summary, a model-predictive control (MPC) with a receding horizon policy can be employed for controlling the outer loop of a two-loop or two-layer control scheme or setup for a HVDC link. The two-loop control scheme takes advantage of the difference in speed of the dynamics of the various system variables of the HVDC link and the interconnected power systems. Model-based prediction representative of the interconnected power systems' behavior allows for comparison of the future effect of different control inputs applied within the control scheme, while taking into account any physical, safety and operating constraints. It is valid for a complete operating range, e.g., it avoids performance degradation when moving away from the nominal operating point of the control scheme for a HVDC link.

Exemplary embodiments of the present disclosure also provide a computer program product including computer program code means for controlling one or more processors of a computer processing device (e.g., a controller) for an HVDC link with a VSC. For instance, exemplary embodiments of the present disclosure provide a non-transitory a computer readable medium (e.g., a non-volatile memory such as a ROM, hard disk drive, optical memory, flash memory, etc.) having a computer program recorded thereon that causes a processor of a computer processing device (e.g., CPU, the controller for the HVDC link, etc.) to carry out any of the features of the exemplary control method described therein.

FIG. 1 shows a High-Voltage Direct-Current (HVDC) link connecting two power systems or electrical grids or (sub-) networks according to an exemplary embodiment. Both power systems (1) are schematically represented through a series connection of a voltage source and a grid impedance $L_g$, and are connected to the HVDC link via an LC filter (2). The HVDC link includes two Voltage-Source Converters (VSC) (3) and a DC line (4). The power systems (1) are representative of any number and arrangement of pieces of primary equipment, including, for example, generators, transformers, filters, AC transmission lines, etc.

Figure 2:
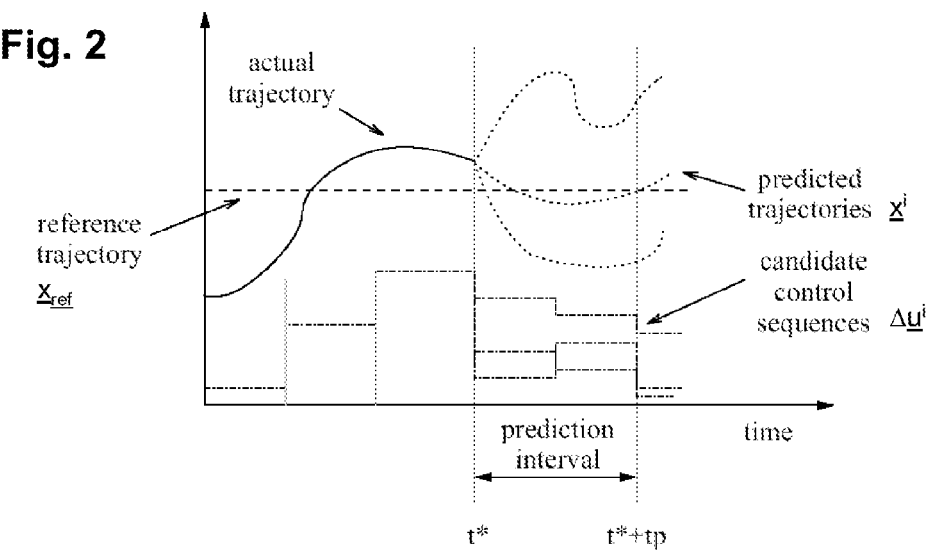
FIG. 2 illustrates main principles of a Model Predictive Control scheme according to an exemplary embodiment of the present disclosure.

FIG. 2 depicts main principles of a Model Predictive Control (MPC) scheme according to an exemplary embodiment. The evolution in time of the system state or of a particular physical system quantity is represented by a one- or multidimensional trajectory. A model taking into account its dynamics is used to predict output trajectories ($x^i$) based on the current state at time $t_o$ and for several different potential candidate input sequences ($\Delta u^i$). An objective or cost function is then defined based on the deviation of each predicted trajectory from a desired reference trajectory ($x_{ref}$) over a window in time called the prediction interval ($t_p$). The effect of the various potential input sequences is evaluated, and the sequence for which the objective function is optimized is selected.

HVDC control ultimately sets modulation voltage references for Pulse-Width Modulator (PWM) units in the VSC in order to regulate the controlled variables, e.g., the active or reactive power transmission across the DC-link ($P_{in}$, $Q_{in}$), the DC-link voltage ($V_{dc}$) and the AC filter voltage amplitudes ($V_{ac}$) at the interface between the converter station and the connected electric power grid (c.f. FIG. 1). References for the aforementioned controlled variables serve as inputs to an outer or external control loop that are known to operate with the aid of a PLL. The PLL is used to synchronize the reference frame of the d-q axes with the filter voltage in order to decouple the control objectives and variables, e.g., for example, active power transmission/d axis variables and filter voltage amplitude/q axis variables, respectively. The outer control loop determines converter current references ($i_{dref}$, $i_{qref}$) of the AC currents entering or leaving the VSCs (c.f.

FIG. 1), which are fed into an inner control loop. Tuning of the PLL may be demanding and the source of unstable behavior of a closed loop system, and the resulting performance can be considerably dependent on the system parameters.

On the other hand, the MPC of the present disclosure is inherently a multi-objective/multi-variable methodology with a prediction model formulated in the time domain. It does not need any additional artifice such as variable decoupling via ad-hoc selected reference frame transformations to synchronize the control system with the grid frequency of the power network. In other words, the MPC solution of the present disclosure includes a control structure that is intrinsically independent of the chosen angle of the d-q reference frame and that therefore does not require the use of a Phase Locked Loop (PLL). The PLL may be retained solely to determine variations in the grid frequency but as this is a slowly changing quantity, it does not significantly affect the dynamics of the HVDC control scheme.

Exemplary embodiment of the present disclosure are based on a two loop or layer structure, wherein the external or outer loop receives the specified control objectives as reference values for the active/reactive power ($P_{in}$, $Q_{in}$) and dc/ac voltage ($V_{dc}$, $V_{ac}$), and determines a sequence of converter current reference values $\{i_{dref}, i_{qref}\}$ as an optimum input sequence. Out of the latter, the first values $i_{dref}^1$, $i_{qref}^1$ are passed to the lower current control loop. The external loop includes an optimization on the basis of a nonlinear control model system including the HVDC link, the LC filters, and the power systems as defined above, with the converter currents as decision variables and the aforementioned active/reactive power and dc/ac voltage references as a control objective. In accordance with an exemplary embodiment, an MPC prediction horizon is of the order of some 10 ms and spans a number of extended sampling periods of, for example, 1 ms each, corresponding to an external loop sampling period or sampling frequency at which systems states, controlled variables and constraints may be updated. The inner loop in turn is based on a linear control model of the HVDC link and the LC filters only, e.g., excluding the power systems being connected by the former, and determines, according to the converter currents requested by the outer loop, the actual modulation voltage references for the PWM units of the VSCs. The latter may be based on any converter topology (e.g., cascaded half-bridges "M²LC" and cascaded full bridges "Chain-link"). The inner loop also takes into account updated system quantities of the linear control model of the HVDC link and the LC filters, which are provided at a system control, and/or sampling, frequency of, for example, 10 kHz. For the inner loop, MPC may be used as well, for example, with a prediction horizon of a fraction of a millisecond (e.g., 0.1 to 0.3 ms). Alternatively, the inner loop may employ conventional, fast and proven PI (Proportional-Integral) control.

Exemplary embodiments of the present disclosure do not require any exchange of information between the two converter stations at the two ends of the HVDC-link, e.g., the two VSC operate independently. This is an important feature in that the high sampling rate of the control system (typically in the range of several kHz) does not allow for reliable information exchange between the two distant converter stations, especially in the face of possible outages in the communication channels.

Figure 3:
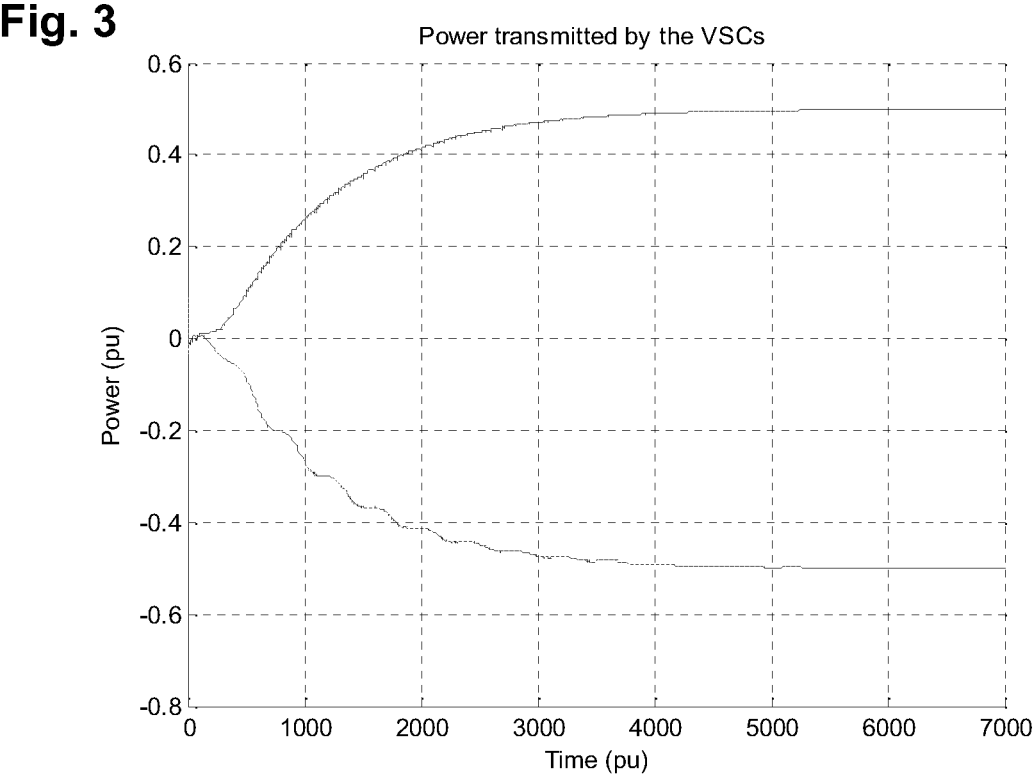
FIG. 3 to 5 depicts an evolution of the controlled variables $P_{in}$, $V_{DC}$ and $V_{AC}$, respectively, according to an exemplary embodiment of the present disclosure.
Figure 4:
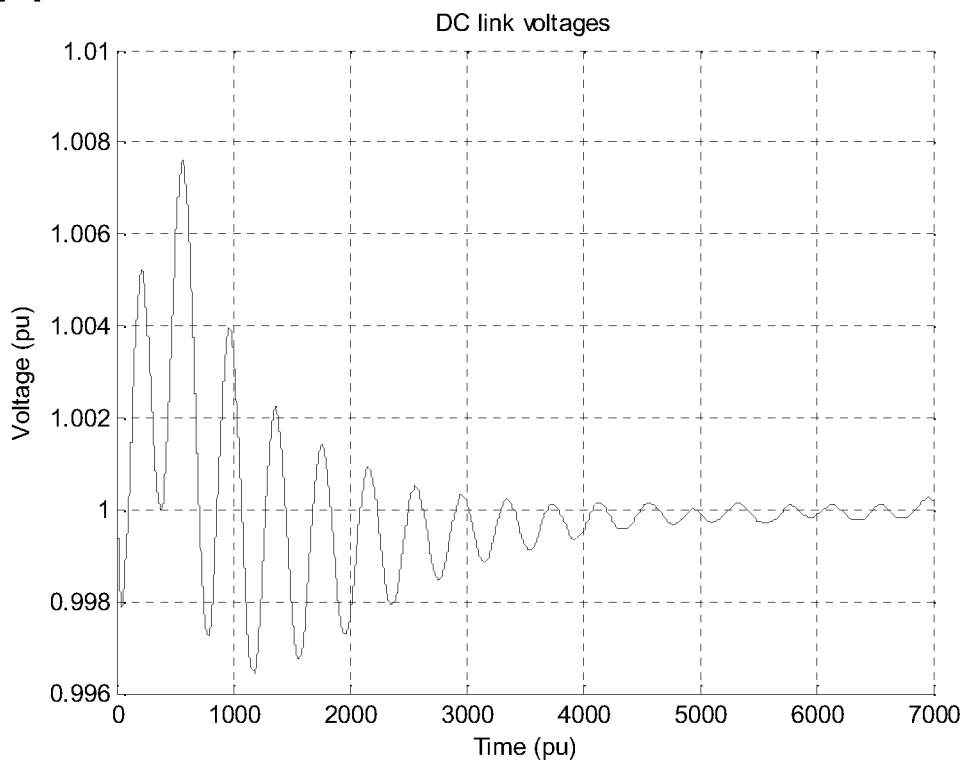
Figure 5:
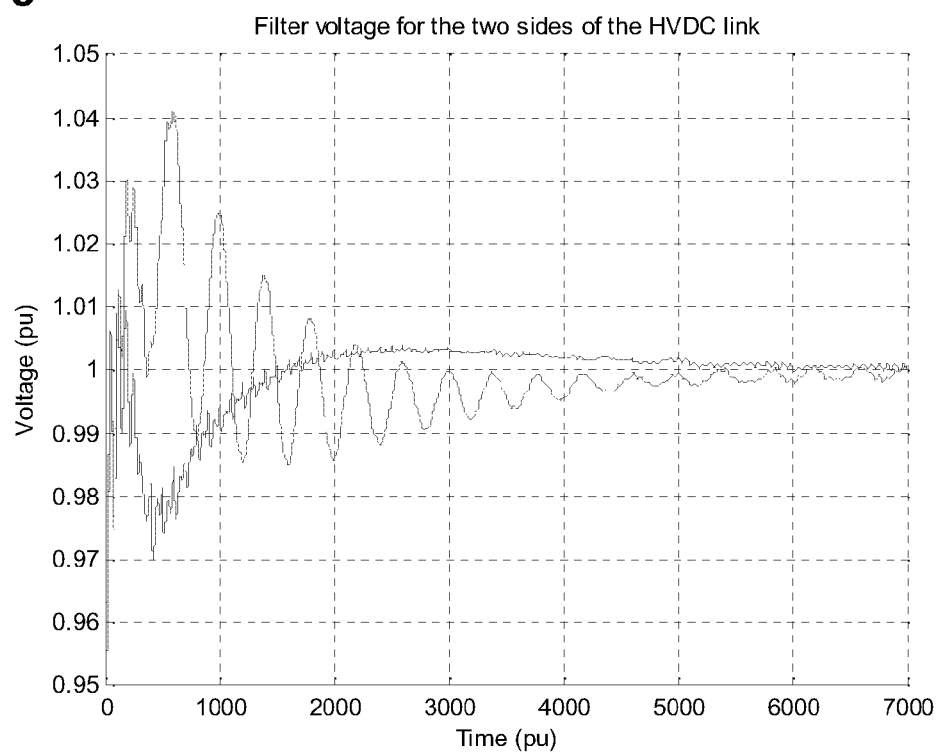

Some simulation results are provided in the following to demonstrate the closed loop performance of the MPC controller in the outer loop of the control scheme. The exemplary control method is particularly effective when dealing with weak networks, (e.g., when the short circuit ratio between AC and DC power of the system is small, such as below 24, which is equivalent to a grid impedance $L_g$ in a range from 0.5 to 1 per unit values). Known control schemes can have considerable difficulty in dealing with such cases. Taking the extreme case when the above ratio and the grid impedance $L_g$ are both equal to 1, FIGS. 3 to 5 show, in per unit values and as a function of time (1 time unit=0.1 msec), the controlled variables, namely the active power transmitted by the VSCs (FIG. 3), the DC voltage of the HVDC link (FIG. 4), and the two filter voltages for the two stations (FIG. 5). The reference value of the transmitted power is +/−0.5, whereas the DC and filter voltages should be steered to 1. As illustrated, the exemplary control method manages to steer the controlled variables to the requested values.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of controlling a High-Voltage Direct-Current (HVDC) link with two Voltage-Source Converters (VSC) and interconnecting two power systems, comprising:
   (a) determining, at the beginning of an extended sampling period, a present state of the HVDC link and the power systems;
   (b) deriving a sequence of desired converter current reference values by optimizing, over a prediction horizon, an objective function based on a prediction model representing the HVDC link and the power systems;
   (c) passing a first one of the desired value, of said sequence to an inner control loop;
   (d) deriving, by the inner control loop and based on said received first one of the desired values, optimized pulse-width modulation voltage reference values;
   (e) applying the optimized pulse-width modulation voltage reference values to a Pulse-Width Modulator unit of a VSC;
   (f) repeating steps (d) and (e) during the extended sampling period; and
   (g) closing an outer control loop by returning to step (a) at the end of the extended sampling period,
   wherein step (b) comprises utilizing model-predictive control with a control structure that is intrinsically independent on a chosen angle of a d-q reference frame, without using a Phase Locked Loop (PLL).

2. The method according to claim 1, wherein step (b) comprises optimizing an objective function based on a piecewise affine prediction model.

3. The method according to claim 1, wherein step (d) comprises deriving the optimized pulse-width modulation voltage reference values by reverting to a look-up table.

4. The method according to claim 1, wherein at least one of the power systems interconnected by the HVDC link comprises a weak network with a grid impedance exceeding 0.5 per unit.

5. The method according to claim 4, wherein step (b) comprises optimizing an objective function that penalizes a deviation from a reference of an AC filter voltage amplitude Vac at the VSC of the HVDC link.

6. The method according to claim 1, wherein step (b) comprises optimizing an objective function that penalizes deviation of a controlled variable from a control objective, and wherein the controlled variable is one of (i) an active or reactive power transmitted across the HVDC link, (ii) a DC-link voltage of the HVDC link, and (iii) an AC filter voltage amplitude at the VSC of the HVDC link.

7. The method according to claim 1, wherein step (b) comprises optimizing an objective function that penalizes deviation of a controlled variable from a control objective, and wherein the controlled variable is an AC filter voltage amplitude at the VSC of the HVDC link.

8. A non-transitory computer-readable medium having a computer program recorded thereon that causes a processor of a computer processing device to control a High-Voltage Direct-Current (HVDC) link with two Voltage-Source Converters (VSC) and interconnecting two power systems, the program causing the processor to execute operations comprising:

(a) determining, at the beginning of an extended sampling period, a present state of the HVDC link and the power systems;

(b) deriving a sequence of desired converter current reference values by optimizing, over a prediction horizon, an objective function based on a prediction model representing the HVDC link and the power systems;

(c) passing a first one of the desired value, of said sequence to an inner control loop;

(d) deriving, by the inner control loop and based on said received first one of the desired values, optimized pulse-width modulation voltage reference values;

(e) applying the optimized pulse-width modulation voltage reference values to a Pulse-Width Modulator unit of a VSC;

(f) repeating operations (d) and (e) during the extended sampling period; and (g) closing an outer control loop by returning to operation (a) at the end of the extended sampling period, wherein operation (b) comprises utilizing model-predictive control with a control structure that is intrinsically independent on a chosen angle of a d-q reference frame, without using a Phase Locked Loop (PLL).

9. The non-transitory computer-readable medium of claim 8, wherein operation (b) comprises optimizing an objective function based on a piecewise affine prediction model.

10. The non-transitory computer-readable medium of claim 8, wherein operation (d) comprises deriving the optimized pulse-width modulation voltage reference values by reverting to a look-up table.

11. The non-transitory computer-readable medium of claim 8, wherein at least one of the power systems interconnected by the HVDC link comprises a weak network with a grid impedance exceeding 0.5 per unit.

12. The non-transitory computer-readable medium of claim 11, wherein operation (b) comprises optimizing an objective function that penalizes a deviation from a reference of an AC filter voltage amplitude Vac at the VSC of the HVDC link.

13. The non-transitory computer-readable medium of claim 8, wherein operation (b) comprises optimizing an objective function that penalizes deviation of a controlled variable from a control objective, and wherein the controlled variable is one of (i) an active or reactive power transmitted across the HVDC link, (ii) a DC-link voltage of the HVDC link, and (iii) an AC filter voltage amplitude at the VSC of the HVDC link.

14. The non-transitory computer-readable medium of claim 8, wherein operation (b) comprises optimizing an objective function that penalizes deviation of a controlled variable from a control objective, and wherein the controlled variable is an AC filter voltage amplitude at the VSC of the HVDC link.

* * * * *